May 6, 1930.    F. J. SINGER    1,757,225
TELEGRAPH ALARM CIRCUIT
Filed April 24, 1929
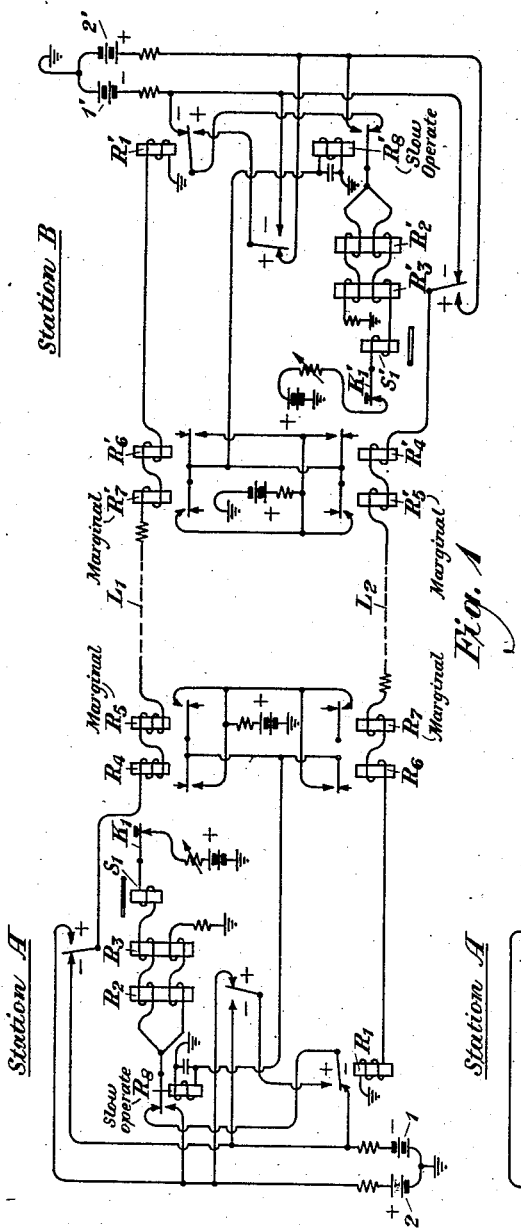
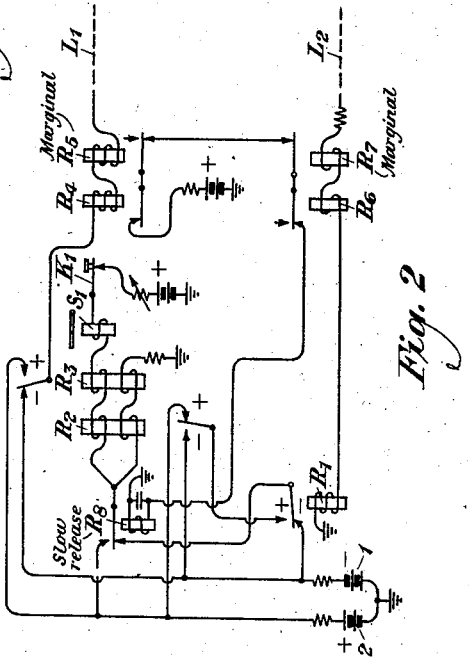
INVENTOR
F. J. Singer
BY
ATTORNEY Patented May 6, 1930

1,757,225

UNITED STATES PATENT OFFICE

FRED J. SINGER, OF ROCKVILLE CENTER, NEW YORK, ASSIGNOR TO AMERICAN TELEPHONE AND TELEGRAPH COMPANY, A CORPORATION OF NEW YORK

TELEGRAPH ALARM CIRCUIT

Application filed April 24, 1929. Serial No. 357,747.

This invention relates to telegraph systems, and more particularly to systems of the direct current polar type.

The invention provides arrangements whereby the repeater attendants and subscribers at both ends of a direct current telegraph system will be notified in case the line circuit in either direction of transmission goes open, is shorted with the other line circuit, or is grounded. In the arrangements of this invention, this is accomplished by including at each station in each side of the line circuit a plurality of relay means which will function in the case of line trouble and cause the appparatus at each station to give a break signal. The arrangements of the invention are particularly useful in connection with one-way polar, four-wire metallic telegraph, and double one-way polar telegraph systems. Further objects and features of the invention will appear more fully from the detailed description thereof hereinafter given.

The invention may be more fully understood from the following description, together with the accompanying drawing, in the Figures 1 and 2 of which the invention is illustrated. In Fig. 1 is shown a double one-way polar telegraph system connected for half duplex operation with the arrangements of the invention associated therewith; Fig. 2 is a modification of the arrangements of Fig. 1. Similar reference characters have been utilized to denote like parts in both of the figures.

As the invention is particularly adapted for use with a double one-way polar telegraph system, it has been shown as associated therewith in Fig. 1 when the system is connected for half duplex operation. However, it is pointed out that it might equally well be used with such a system when connected for full duplex operation or for other types of systems. The arrangements of Fig. 1 show a telegraph line circuit comprising the lines $L_1$ and $L_2$ interconnecting stations A and B. At station A there is provided a loop circuit which will include the key $K_1$, the sounder $S_1$, the sending relay $R_8$, and a break relay $R_2$. The windings of the relays $R_2$ and $R_3$ are arranged in the usual balanced relation. The loop circuit is completed over the contacts of a receiving relay $R_1$ and may be connected either to the negative battery 1 or the positive battery 2. Connected to the junction point of the windings of relays $R_2$ and $R_3$ is a switching arrangement controlled by the slow operate relay $R_8$. The operation of this relay connects the windings of relays $R_2$ and $R_3$ directly to battery instead of through the armature and one contact of relay $R_1$ to battery. Relay $R_8$ is controlled by circuit arrangements under control of the relays $R_4$ and $R_5$ serially included in line $L_1$ and relays $R_6$ and $R_7$ serially included in line $L_2$. At the station B are provided arrangements identical with those at station A. Similar reference characters with the added designation prime (') have been utilized to denote elements at this station similar to those already described with respect to station A.

It is believed that the arrangements of the invention may be more readily understood from the following description of the operation of the double one-way polar system in half duplex operation as illustrated in Fig. 1. When the telegraph key $K_1$ at station A is closed, current of 60 milliamperes flows from ground through the key $K_1$, sounder $S_1$, upper windings of relays $R_2$ and $R_3$ through the armature of relay $R_1$ to $-130$ volt battery to ground. At the same time another current of 30 milliamperes value flows from ground through the lower windings of relays $R_2$ and $R_3$ through the armature of relay $R_1$ and through $-130$ volt battery to ground. This latter current is in a direction to oppose that flowing in the upper windings of relays $R_2$ and $R_3$ but is only half the value, so that armatures of relays $R_2$ and $R_3$ are held on their marking contacts. The armature of relay $R_3$, being on its marking contact, closes the line circuit $L_1$ to $-130$ volt battery at station A, and therefore current of about 35 milliamperes flows over the line circuit $L_1$ to station B, returning to station A through ground. The direction of this current is such that relay $R'_1$ at station B is held on its marking contact. Since the armature of relay $R'_1$ is on its marking contact, a current of 60 milliamperes value flows through the lower windings of relays $R'_2$ and $R'_3$ and at the same time an opposing current of 30 milliamperes flows through the upper windings of relays $R'_2$ and $R'_3$. The 60-milliampere current flowing through the lower windings of these relays is stronger than the current through the upper windings, and causes the armatures of these relays to stay on their marking contacts and also causes the sounder $S'_1$ to be closed.

Now let it be assumed that at station A the operator opens the key $K_1$. Current will stop flowing through the upper windings of relays $R_2$ and $R_3$ and the current flowing through the lower windings of these relays will cause the armatures of these relays to move to their spacing contacts. When the armature of relay $R_3$ is on its spacing contact the opposite polarity of battery will be connected to the line $L_1$, causing the armature of relay $R'_1$ at station B to operate to its spacing contact. This operation connects the same polarity battery on both terminals of the lower windings of relays $R'_2$ and $R'_3$ and therefore no current flows through that circuit which includes the sounder $S'_1$. Sounder $S'_1$ therefore operates to spacing and the spacing signal sent from key $K_1$ at station A is received on the sounder $S'_1$ at station B. The operation of $R'_1$ to spacing also reverses the direction of the 30-milliampere current flowing through the upper windings of relays $R'_2$ and $R'_3$ so that these relays are held on their marking contacts.

It is pointed out that regardless of whether the telegraph key $K_1$ at station A is opened or closed, the relays $R'_2$ and $R'_3$ at station B will remain on their marking contacts because (1) the current through the upper windings of relays $R'_2$ and $R'_3$ is equal to 30 milliamperes and opposes the effect of the 60-milliampere current when the key $K_1$ at station A is closed and the relay $R'_1$ at station B is on its marking contact, but (2) is reversed and therefore still holds the relay armatures of relays $R'_2$ and $R'_3$ on their respective marking contacts when the key $K_1$ at station A is opened, although for this condition the armature of the relay $R'_1$ at station B is on its spacing contact and sounder $S'_1$ is open. Therefore, when the operator at station A is sending telegraph signals over line $L_1$, the current flowing over line $L_2$ to station A from the $-130$ volt battery at station B and returning to station B through ground, continues to flow, and relay $R_1$ at station A is held on its marking contact.

If the operator at station A is sending and the operator at station B wishes to break him, the operator at station B will open his key $K'_1$. If the operator at station A has his key $K_1$ open at this time, he will not be aware that a break signal is being sent to him. However, as soon as he closes his key, the armature of relay $R'_1$ at station B will move to the marking contact, and since this reverses the current through the upper windings of relays $R'_2$ and $R'_3$, the armatures of these relays will move to the spacing contacts and current of opposite polarity will be sent over line $L_2$ to operate armature of relay $R_1$ at station A to its spacing contact. When the armature of relay $R_1$ operates to its spacing contact, the current through the lower windings of relays $R_2$ and $R_3$ will be reversed and the current through the upper windings of these relays will be reduced to zero, due to the fact that the same polarity battery is connected to both ends of these windings. This will cause sounder $S_1$ to operate to spacing and the operator at station A will know that station B has broken him. The operator at station B can now begin sending, and as soon as he sends, the marking current will continue to flow over line $L_1$ and hold relay $R'_1$ at station B on its marking contact, as was the case before with relay $R_1$ when the operator at station A was sending to station B.

Let it now be assumed that the line $L_1$ is broken or opened up when the operator at station A is sending. The current will be removed from relay $R'_1$ at station B, but due to the residual magnetism, its armature is apt to remain on the marking contact. The operator at station B will therefore not know that the line has failed and may not open his key $K'_1$ for some time to find out if there is any trouble. In the meantime, the operator at station A will continue to send, not knowing that the line is broken because his local circuit is under the control of relay $R_1$ and his telegraph key $K_1$, and unless the line $L_2$ has also failed, he will have no indication that station B is not receiving his message.

To prevent the above conditions from occurring, and to enable the operators at stations A and B to know when line $L_1$ has opened up, the relays $R_4$, $R_8$, $R'_6$, and $R'_8$ have been added to the telegraph system. The action of these relays in overcoming the above described objection will now be explained. Relays $R_4$ and $R'_6$ are connected in series with the line $L_1$, and as long as the line is closed will remain operated except for a possible kick-off during the time the armature of relay $R_3$ is moving from its marking and spacing contact and vice versa. The armature circuits of relay $R_4$ and $R'_6$ control the operation of the relays $R_8$ and $R'_8$, respectively. However, since relays $R_8$ and $R'_8$ are slow-operating relays, the armatures of relays $R_4$ and $R'_6$ must remain released for one or two seconds before relays $R_8$ and $R'_8$ will operate. This situation enables the relays $R_4$ and $R'_6$ to kick off for short intervals of time during normal operation of the line circuit without causing relays $R_8$ and $R'_8$ to operate. However, if the line circuit $L_1$ is opened for one second or more, relays $R_4$ and $R'_6$ are released and relays $R_8$ and $R'_8$ are operated until the line closes again. Operation of relay $R_8$ with relay $R_1$ on its marking contact, causes the opposite polarity of battery to be connected to the windings of relays $R_2$ and $R_3$ and therefore causes the sounder $S_1$ at station A to be opened, giving the operator at that station an indication that line $L_1$ has failed. At the same time operation of relay $R'_8$ at station B will reverse the polarity of the battery connected to the windings of relays $R'_2$ and $R'_3$ and open sounder $S'_1$, thereby also establishing the break at station B, even though the armature of relay $R'_1$ may remain on its marking contact, due to residual magnetism in the relay. Both operators are therefore automatically informed that a failure has occurred. When the line $L_1$ is closed again, relays $R_4$ and $R'_6$ will again be energized and their armatures will be pulled up, causing relays $R_8$ and $R'_8$ to release and restore the circuit to normal again.

If the line $L_1$ is broken when the operator at station B is sending, the relays $R_4$ and $R'_6$ will release and relays $R_8$ and $R'_8$ will operate, as heretofore described. When the relay $R'_8$ operates, the opposite polarity battery will be connected to the junction point of the windings of relays $R'_2$ and $R'_3$ at station B. This will tell the operator at station B that the circuit between him and station A is broken. At station A the operation of relay $R_8$ will likewise tell the operator, who has been receiving signals from station B that the circuit between him and station B is broken. Therefore, regardless of whether the operator at station A or the operator at station B is sending and line $L_1$ is broken, both will receive the break signal.

Similarly if line $L_2$ is broken when either operator is sending, the release of relays $R'_4$ and $R_6$ and the operation thereby of relays $R_8$ and $R'_8$ will break the operators at both stations, and when the line $L_2$ is restored to normal again, relays $R'_4$ and $R_6$ will again operate and cause relays $R_8$ and $R'_8$ to release and restore the telegraph connections to normal.

Another line trouble that will be taken care of by the alarm circuit arrangements of the invention, is a grounded line. For example, let it be assumed that line $L_1$ becomes grounded and that the operator at station A is sending at this time. The armature of relay $R_3$ will be on its marking or spacing contact, depending on whether he is sending a marking or a spacing signal. In either case battery will be connected to line $L_1$ and will be flowing through the windings of relays $R_4$ and $R_5$. When the line is grounded, this current through relays $R_4$ and $R_5$ will become abnormally large. Relay $R_4$ will not be affected and will remain operated, but relay $R_5$ will now operate. Relay $R_5$ is a marginal relay and is normally released but is designed to operate on a current of a predetermined value slightly greater than the line current when the line circuit is closed and when a large leakage is present. Operation of this relay will energize relay $R_8$ which, in turn, will operate and break the operator at station A. Station B will receive the break signal because relay $R'_6$, connected in the line $L_1$, will have the current removed from it, due to the ground in the line and will therefore release and operate $R'_8$ which, in turn, will give the operator at station B a break signal.

When the ground is removed from the line circuit $L_1$, the respective alarm relays will be restored to normal and the telegraph circuits between the two stations will also return to normal. Similar results will be obtained if the operator at station B is sending when the line $L_1$ is grounded. Furthermore, by means of relays $R'_5$, $R_6$, $R_8$, and $R'_8$ a break signal is established at both stations if line $L_2$ is grounded.

A third line trouble that is taken care of by the arrangements of this invention, is a case of short-circuit between the two lines $L_1$ and $L_2$. For example, if lines $L_1$ and $L_2$ are short-circuited and if the current becomes excessive in either end of the circuit, the relays $R_5$ and $R_7$ or relays $R'_7$ and $R'_5$ will operate and in turn operate the corresponding relays $R_8$ or $R'_8$ and break the two operators. On the other hand, if the current is reduced to zero at either end, relays $R_4$ and $R_6$ or relays $R'_6$ and $R'_4$ will be released. The release of these relays will operate the corresponding relays $R_8$ or $R'_8$ and also give the operators the break signal.

It is pointed out that in the arrangements heretofore described, the relays $R_8$ and $R'_8$ are normally released and are slow to operate when current is passed through them. The advantage of this arrangement is that normally no current is drawn from the batteries supplying the windings of these two relays. The disadvantage lies in the difficulty of obtaining a relay which will operate slowly. Accordingly, an alternative alarm circuit arrangement is illustrated in Fig. 2. In this arrangement, the contacts of relays $R_4$, $R_5$, $R_6$, and $R_7$ are connected in series rather than in parallel, and normally, current flows through the winding of relay $R_8$. With such an arrangement the relay $R_8$ may be made a slow-release relay rather than a slow-operate relay. As the operation of the arrangements in other respects would be substantially similar to that heretofore given, no further description will be given.

While the invention has been disclosed as embodied in certain specific arrangements which are deemed desirable, it is understood that it is capable of embodiment in many and other forms and types of circuits, without departing from the spirit of the invention as defined by the appended claims.

What is claimed is:

1. A telegraph circuit interconnecting two stations of the polar duplex type, a loop circuit at one of said stations including a sounder and balanced sets of windings of a break relay and a sending relay, and means responsive to an abnormal current condition in said telegraph circuit for reversing the polarity of the current connected to the junction point of said sets of relay windings in said loop circuit.

2. A telegraph circuit interconnecting two stations of the polar duplex type, a loop circuit at one of said stations including a sounder and balanced sets of windings of a break relay and a sending relay, switching means for reversing the polarity of the current normally connected to the junction point of said sets of windings in said loop circuit, an alarm circuit for operating said switching means, and relay means in said telegraph circuit for operating said alarm circuit.

3. A telegraph circuit interconnecting two stations of the polar duplex type, a loop circuit at one of said stations including a sounder and balanced sets of windings of a break relay and a sending relay, switching means for reversing the polarity of the current normally connected to the junction point of said sets of windings in said loop circuit, an alarm circuit for operating said switching means, a relay connected to one of the conductors of said telegraph circuit and operated by the normal flow of current thereover, and means controlled by the release of said relay for operating said alarm circuit.

4. A telegraph circuit interconnecting two stations of the polar duplex type, a loop circuit at one of said stations including a sounder and balanced sets of windings of a break relay and a sending relay, switching means for reversing the polarity of the current normally connected to the junction point of said sets of windings in said loop circuit, an alarm circuit for operating said switching means, a marginal relay connected to one of the conductors of said telegraph circuit and operated by a flow of current thereover greater than normal, and means controlled by the operation of said relay for operating said alarm circuit.

5. A telegraph circuit interconnecting two stations of the polar duplex type, a loop circuit at one of said stations including a sounder and balanced sets of windings of a break relay and a sending relay, slow operate switching means for reversing the polarity of the current normally connected to the junction point of said sets of windings in said loop circuit to operate said sounder as a "break" signal, and means controlled by an abnormal current condition in said telegraph circuit for operating said slow operate switching means.

6. A telegraph circuit interconnecting two stations of the polar duplex type, a loop circuit at each of said stations including a sounder and balanced sets of windings of a break relay and a sending relay, slow operate switching means at each station for reversing the polarity of the current normally connected to the junction points of said sets of windings in each of said loop circuits whereby the sounders therein will operate as "break" signals, and means controlled by an abnormal current condition in any of the conductors of said telegraph circuit for operating both of said slow operate switching means.

7. A telegraph circuit interconnecting two stations of the polar duplex type, a loop circuit at one of said stations including a sounder and balanced sets of windings of a break relay and a sending relay, switching means for reversing the polarity of the current normally connected to the junction point of said sets of windings in said loop circuit, an alarm circuit for operating said switching means, a relay connected to one of the conductors of said telegraph circuit and operated by the normal flow of current thereover, a marginal relay connected to said last mentioned one of said conductors of said telegraph circuit and operated by a flow of current thereover greater than normal, and means for completing said alarm circuit over the contacts of said relays.

In testimony whereof, I have signed my name to this specification this 23rd day of April, 1929.

FRED J. SINGER.